Patented Feb. 11, 1936

2,030,192

UNITED STATES PATENT OFFICE

2,030,192

PROCESS OF MAKING UREA RESIN MOLDING POWDERS

Philip Bickford Watson, New York, N. Y., assignor, by mesne assignments, to American Cyanamid Company, a corporation of Maine No Drawing. Application February 12, 1931, Serial No. 515,399. Renewed October 12, 1934

6 Claims. (Cl. 260—3)

My invention relates to a process of the manufacture of urea resins, that is to say, condensation products of a urea such as urea, thiourea, derivatives thereof or mixtures of the same, with formaldehyde and with or without condensing agents.

The object of my invention is to provide a process for the manufacture of urea resins, by which term I mean any or all of the materials above referred to, whereby molding powders may be made therefrom of such a character as to be capable of being uniformly and effectively molded under heat and pressure into any desired objects. In the manufacture of molding powders from urea resins, difficulty has been experienced in uniformly obtaining the same required characteristics for the molding powder so that the molding powder would invariably harden or cure under the application of heat and pressure in the mold, to the same extent and with the same speed of hardening so as to produce, invariably, articles having the same physical characteristics as to tensile strength, insolubility, etc. I have discovered that this is largely due to variations in the temperatures to which the molding powder is subjected during the grinding operation and that if the temperature of the material, while being ground, is allowed to exceed the critical temperature 40° C., the material will become so insensitive to the heat and pressure of the final molding operation as to be difficult or impossible to handle in securing a uniform product of the desired character. I have found, thus, that, in effect, there is a preferred temperature of from 33 to 37° C., but generally 35° C., of the urea resin while being ground, as otherwise it is impossible to secure the maximum flow, as well as strength and insolubility in the final product. I have found, also, that this is particularly true in regard to a urea resin, that is to say, for example, the condensation product of a mixture containing approximately 50% of urea and 50% of thiourea with formaldehyde as well as a condensation agent, as for instance in the process as given hereinafter. I have found these temperatures to be particularly applicable in the production of urea resin molding powders such as the following:

For example, in carrying out my invention I may provide 2700 lbs. of commercial aqueous formaldehyde, that is to say, containing approximately 40° by volume of formaldehyde. The aqueous formaldehyde thus prepared is introduced into the syrup kettle. 88 lbs. of aqua ammonia of 26° Bé. are then added. I then add 888 lbs. of thiourea and 700 lbs. of urea. These proportions may be considerably varied, of course, as desired. For instance, the amounts of thiourea and urea just mentioned may be considered as an example of the formation of the mixed urea resin made from substantially 50% of thiourea and 50% of urea, as above referred to. The mixture is now agitated until the solution of the solids is complete, the temperature being controlled preferably so as not to exceed 30° C., cooling being applied to this end where the atmospheric temperature is unduly high, in order to avoid gelatination of the syrup. This syrup usually is allowed to stand for a day after the mixing, but may be used shortly after mixing, if desired, although it is found undesirable to allow it to stand for a period of over two weeks. In this reaction the ammonia combines with formaldehyde to form hexamethylenetetramine, which is a neutral substance. 408 lbs. of the syrup thus formed and 133 lbs. of disintegrated paper pulp are added to a Werner-Pfleiderer mixer. Steam is then applied to the Werner-Pfleiderer mixer and the mixture is kneaded for approximately 1¼ hours, during which the mixture reaches a temperature of about 70° C., and a considerable amount of the water originally introduced with the formaldehyde is accordingly driven off. At the end of the mixing period the wet pulp is spread on pans and carefully dried at a moderately elevated temperature.

The dried material is then ground in a ball-mill of any desired character, to an impalpable powder, great care being taken to avoid the material reaching a temperature of higher than 40° C., inasmuch as it has been found that if such a temperature is exceeded the effective curing or hardening of the ultimate product is no longer possible. In fact care is taken preferably to carry out the grinding at a temperature of 33 to 37° C., as for instance, 35° C., which can be effectively accomplished by grinding the materials in a ball-mill surrounded with a cooling jacket containing b ine at a temperature of 26° F. Before the grinding, 0.5% by weight of zinc stearate, as compared with the weight of the other materials present, is added to the ball-mill. This acts as a lubricant in molding. At this point, also, if desired, any desired dyestuff or pigment may be added to the ball-mill. A ball-mill which may be used in this connection may be, for example, the ball-mill as shown and described in my co-pending application upon Dustless discharge housing, executed on the 7th day of February, 1931, Serial No. 515,318, filed February 12, 1931.

The molding powder thus obtained is then screened and packed and may be molded into any desired objects by placing it in any suitable mold and subjecting the molding powder to a temperature of 135° C. and a pressure of about 2 tons per square inch.

While I have described my invention above in detail I wish it to be understood that many changes may be made therein without departing from the spirit of the same.

I claim:

1. A process of producing a urea resin molding material which comprises the step of grinding the dried material and simultaneously maintaining a temperature not exceeding 40° C. in order to prevent irregularities in subsequent curing.

2. A process of producing a urea resin molding material which comprises the step of grinding the dried material and simultaneously maintaining a temperature of 33 to 37° C. in order to prevent irregularities in subsequent curing.

3. A process of producing a urea resin molding material capable of uniform curing which comprises the step of grinding the dried material and simultaneously maintaining it in heat exchanging relation with a cooling medium having a temperature such that the temperature within the resinous material does not exceed 40° C.

4. A process of producing a urea resin molding material which comprises reacting formaldehyde with an urea to form a soluble, fusible condensation product, admixing said product with a fibrous filler material, drying the mixture and grinding the dried material while simultaneously maintaining a temperature not exceeding 40° C. in order to prevent irregularities in subsequent curing.

5. A process of producing a urea resin molding material which comprises reacting formaldehyde with a urea to form a soluble, fusible condensation product, admixing said product with a fibrous filler material at a temperature of about 70° C., drying the mixture and grinding the dried material while simultaneously maintaining a temperature not exceeding 40° C. in order to prevent irregularities in subsequent curing.

6. In a process of producing a urea resin molding material by reacting formaldehyde with an urea to form a soluble, fusible condensation product and admixing said product with a fibrous filler material, which mixture is then dried, the step of grinding the dried mixture at a temperature which does not exceed 40° C. during the grinding, whereby irregularities in subsequent curing of the finished product are prevented.

PHILIP BICKFORD WATSON.